May 17, 1938.    C. D. KEATON    2,117,729
ELECTRIC COFFEE MAKER
Filed Jan. 29, 1937
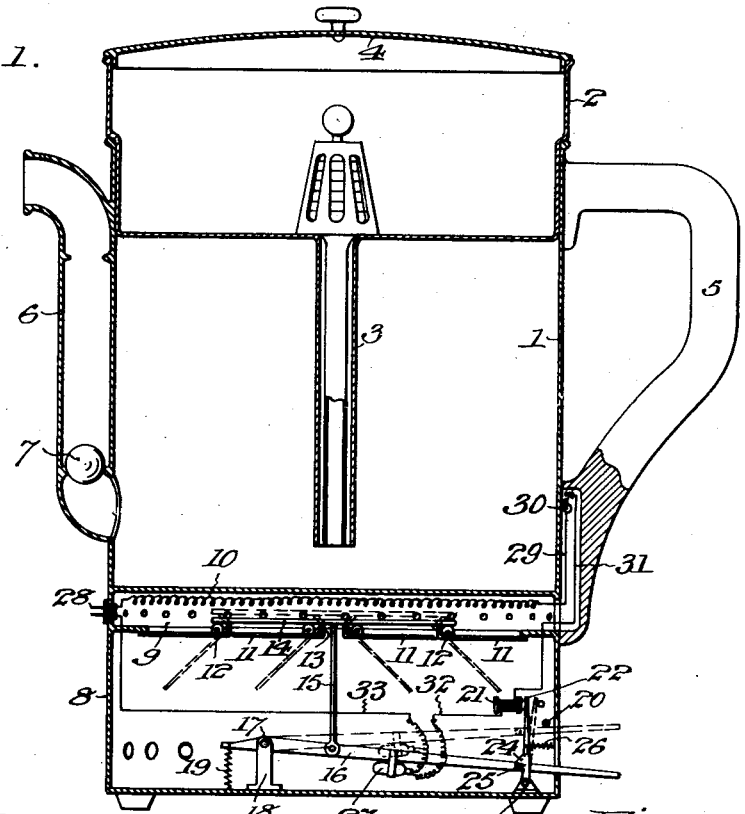
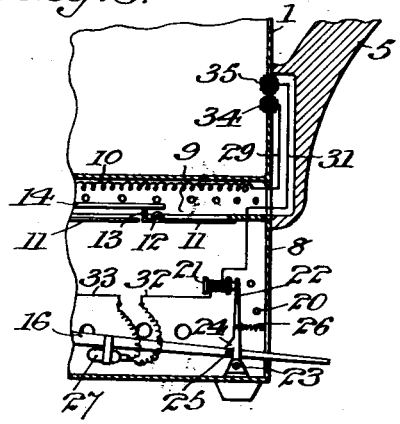
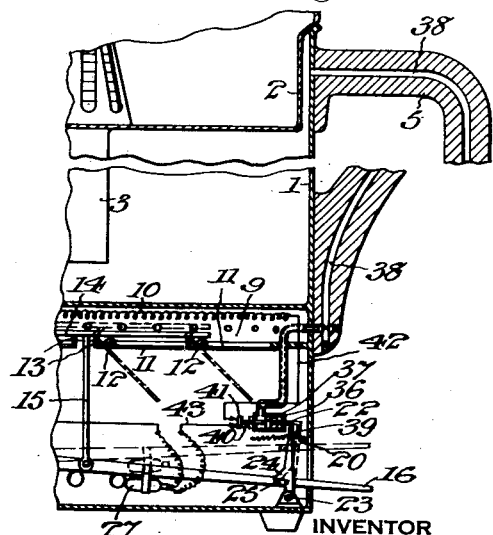
INVENTOR
Clyde D. Keaton
BY
ATTORNEYS Patented May 17, 1938

2,117,729

UNITED STATES PATENT OFFICE 2,117,729

ELECTRIC COFFEE MAKER

Clyde D. Keaton, Long Island City, N. Y., assignor to Stanley S. Tumbridge, New York, N. Y.

Application January 29, 1937, Serial No. 122,945

18 Claims. (Cl. 219—44)

The object of my invention is to provide an electric coffee maker of the vacuum type in which automatic means under the control of the contents of the coffeepot is employed to cut off the heat when the coffee reaches a predetermined point in its making.

A further object of my invention is to provide automatic means for hastening the cooling of the electric heating element when the current is cut off therefrom.

My invention comprises, generally, an electric coffee maker of the above type in which the electric heater is provided with a heating element, the circuit being completed therethrough by the manual setting of a switch in the circuit.

My invention further comprises an electric coffee maker in which the circuit through the heating element is cut off when the water in the lower chamber of the coffeepot is forced upwardly into the upper chamber thereof through a filter of well known or approved form.

My invention also comprises an automatic ventilator for air cooling the heating element when the circuit therethrough has been broken, said ventilator being closed when the current is passing through the heating element.

My invention still further comprises an electric coffee maker in which a hand lever is used to operate a switch in the circuit to complete the circuit through the heating element, said hand lever being under the control of the contents of the coffeepot for throwing the lever to open the switch and thereby open the circuit through said heating element.

Practical embodiments of my invention are represented in the accompanying drawing, in which—

Fig. 1 represents a vertical central section through one embodiment of my invention in which a thermostat controlled by the variations of heat in the lower chamber of the coffeepot is provided for opening and closing the circuit through the heating element;

Fig. 2 represents a detail side view of the air controlling shutters for the heating chamber;

Fig. 3 represents a detail vertical central section through a second embodiment of my invention in which two spaced terminals are located in the lower chamber of the coffeepot, said terminals being electrically connected and disconnected as the water rises and falls in said lower chamber; and Fig. 4 represents a similar section through a third embodiment of my invention in which the rise and fall of steam pressure in the lower chamber of the coffeepot controls the opening and closing of the circuit through the heating element.

The coffeepot comprises a lower vessel 1, an upper vessel 2 nested therein and a filter 3 of any well known or approved form for establishing communication between the lower and upper chambers of said vessels.

The upper vessel 2 may be provided with a removable cover 4. The lower vessel may be provided with a handle 5 and a pouring spout 6, within which pouring spout there is seated a weighted valve 7, in the present instance of the ball type for preventing the escape of steam from the lower chamber through the said spout.

The electric heater casing which is formed integral with the lower vessel 1 of the coffeepot is denoted as a whole by 8. This casing 8 is provided with a heating chamber 9 in which the heating element 10 is located. Shutters 11, pivoted at 12, serve to open and close the open bottom of the heating chamber 9. These shutters are held closed against their tendency to open by gravity by providing the shutters at one side of their pivots 12 with upturned lips 13 engaged by a horizontal plate 14 connected by an upright rod 15 to a horizontally disposed hand lever 16 pivoted at 17 to a bracket 18 uprising from the bottom of the heater casing 8. A spring 19 tends to lift the hand lever 16 to the limit of its upward movement against a stop 20. This hand lever is releasably held at the limit of its downward movement by an electromagnet 21 and its trip lever 22 pivoted at 23 to the bottom of the heater casing 8. This trip lever 22 is provided with a shoulder 24 which engages a projection 25 on the hand lever 16 when the trip lever 22 is swung to the limit of its forward movement by the energization of the electromagnet 21. A spring 26 serves to swing the lever 22 outwardly when the electromagnet 21 is deenergized, to release the projection 25 from the shoulder 24 of the said trip lever 22.

A switch 27, in the present instance a mercury switch is mounted on the hand lever 16 in position to close the circuit through the switch when the hand lever is in its depressed position and to open the circuit through the switch when the hand lever is in its raised position.

The main line wire 28 leads into the heater to the heating element 10. A wire 29 leads from the heating element 10 upwardly in the handle 5 to a thermostat 30 which is located close to the outer wall of the lower vessel 1 of the coffeepot. A wire 31 also located in the handle 5 leads from the thermostat 30 to the electromagnet 21. A wire 32 leads from the electromagnet 21 to the switch 27 and the other main line wire 33 leads from the switch 27 outwardly through the heater casing.

In the form shown in Fig. 3, the wires 29 and 31 are provided with terminals 34 and 35 located within the lower chamber of the coffeepot, the electric circuit at this point being made and broken by the water as it rises and falls within the said lower chamber to points above and below the terminals 34, 35.

In the form shown in Fig. 4, the trip lever 22 for the hand lever 16 is pressure controlled by a pump 36, the interior of which pump on one side of the piston 37 which is carried by the trip lever 22 is open to pressure within the lower chamber of the coffeepot through the passage 38 which leads from the pump to the upper end of the said lower chamber. Pressure upon the opposite side of the piston 37 is exerted by means of a spring 39, which spring also tends to hold the trip lever 22 in its locking engagement with the hand lever 16. The piston rod 40 carries a contact plate 41 arranged to open and close the circuit through the wire 42 leading from the heating unit 10, and the wire 43 leading to the switch 27.

In the form shown in Fig. 1, the operation is as follows:

The upper and lower chambers of the coffeepot are supplied with the desired amounts of ground coffee and water respectively. The hand lever 16 may then be depressed, thereby closing the shutters 11 and tilting the mercury switch 27 to close the circuit at this point. The depression of the hand lever 16 will cause the energization of the electromagnet 21 and cause the trip lever 22 to be moved inwardly to lock the hand lever 16 in its depressed position. With the parts in these positions the circuit is passing through the heating element and the water in the coffeepot is subjected to the heat therefrom. After the water has been boiled and most of it has passed up into the upper chamber through the filter 3 the heat in the lower chamber rises to a point which causes the thermostat 30 to open and thereby break the circuit through the heating element and also through the electromagnet 21. This will cause the trip lever 22 to release the hand lever 16 and permit the hand lever to swing upwardly to open the shutters and to tilt the mercury switch 27 to also open the circuit at this point.

In the form shown in Fig. 3, the operation is quite similar with the exception that the water in the lower chamber closes or opens the circuit across the terminals 34, 35 as the water rises or falls to levels above and below the terminals.

In the form shown in Fig. 4, the pump 36 which operates the trip lever 22 is controlled by the rise and fall of the fluid pressure within the lower chamber of the coffeepot. Otherwise the operation is quite similar to the operation of the forms shown in Figs. 1 and 3.

It is evident that various changes may be resorted to in the construction, form and arrangement of the several parts without departing from the spirit and scope of my invention, and hence I do not intend to be limited to the particular embodiments herein shown and described, but—

What I claim is:

1. In an electric coffee maker, a casing having a heating chamber, a heating element therein, a ventilator for the heating chamber, a coffeepot, manually operated means for closing the ventilator and also closing the circuit through the heating element, and automatic means controlled by the contents of the coffee-pot for opening the circuit through the heating element and also for opening the ventilator to cool the heating element.

2. In an electric coffee maker, a casing having a heating chamber, a heating element therein, a ventilator for the heating chamber, a coffeepot including a lower vessel formed integral with the heater casing, manually operated means for closing the ventilator and also closing the circuit through the heating element, and automatic means controlled by the contents of the coffeepot for opening the circuit through the heating element and also for opening the ventilator to cool the heating element.

3. In an electric coffee maker, a casing having a heating chamber, a heating element therein, ventilating shutters for the heating chamber, a coffeepot, a hand lever for closing the shutters and also closing the circuit through the heating element, and automatic means controlled by the contents of the coffeepot for opening the circuit through the heating element and also for opening the shutters.

4. In an electric coffee maker, a casing having a heating chamber, a heating element therein, ventilating shutters for the heating chamber, a coffeepot including a lower vessel formed integral with the heater casing, a hand lever for closing the shutters and also closing the circuit through the heating element, and automatic means controlled by the contents of the coffeepot for opening the circuit through the heating element and also for opening the shutters.

5. In an electric coffee maker, a casing having a heating chamber, a heating element therein, a ventilator for the heating chamber, a coffeepot, manually operated means for closing the ventilator and also closing the circuit through the heating element, and automatic means controlled by the contents of the coffeepot for opening the circuit through the heating element and also for opening the ventilator to cool the heating element, said automatic means including a thermostat carried by the coffeepot.

6. In an electric coffee maker, a casing having a heating chamber, a heating element therein, a ventilator for the heating chamber, a coffeepot including a lower vessel formed integral with the heater casing, manually operated means for closing the ventilator and also closing the circuit through the heating element, and automatic means controlled by the contents of the coffeepot for opening the circuit through the heating element and also for opening the ventilator to cool the heating element, said automatic means including a thermostat carried by the coffeepot.

7. In an electric coffee maker, a casing having a heating chamber, a heating element therein, a ventilator for the heating chamber, a coffeepot, manually operated means for closing the ventilator and also closing the circuit through the heating element, and automatic means controlled by the contents of the coffeepot for opening the circuit through the heating element and also for opening the ventilator to cool the heating element, said automatic means including spaced terminals in the coffeepot.

8. In an electric coffee maker, a casing having a heating chamber, a heating element therein, a ventilator for the heating chamber, a coffeepot including a lower vessel formed integral with the heater casing, manually operated means for closing the ventilator and also closing the circuit through the heating element, and automatic means controlled by the contents of the coffeepot for opening the circuit through the heating element and also for opening the ventilator to cool the heating element, said automatic means including spaced terminals in the coffeepot.

9. In an electric coffee maker, a casing having a heating chamber, a heating element therein, a ventilator for the heating chamber, a coffeepot, manually operated means for closing the ventilator and also closing the circuit through the heating element, and automatic means controlled by the contents of the coffeepot for opening the circuit through the heating element and also for opening the ventilator to cool the heating element, said automatic means including a pressure controlled pump.

10. In an electric coffee maker, a casing having a heating chamber, a heating element therein, a ventilator for the heating chamber, a coffeepot including a lower vessel formed integral with the heater casing, manually operated means for closing the ventilator and also closing the circuit through the heating element, and automatic means controlled by the contents of the coffeepot for opening the circuit through the heating element and also for opening the ventilator to cool the heating element, said automatic means including a pressure controlled pump.

11. In an electric coffee maker, a casing having a heating chamber, a heating element therein, ventilating shutters for the heating chamber, a coffeepot, a hand lever for closing the shutters and also closing the circuit through the heating element, and automatic means controlled by the contents of the coffeepot for opening the circuit through the heating element and also for opening the shutters, said automatic means including a thermostat in the coffeepot, a switch carried by the hand lever, a trip lever and an electromagnet for operating it.

12. In an electric coffee maker, a casing having a heating chamber, a heating element therein, ventilating shutters for the heating chamber, a coffeepot including a lower vessel formed integral with the heater casing, a hand lever for closing the shutters and also closing the circuit through the heating element, and automatic means controlled by the contents of the coffeepot for opening the circuit through the heating element and also for opening the shutters, said automatic means including a thermostat in the coffeepot, a switch carried by the hand lever, a trip lever and an electromagnet for operating it.

13. In an electric coffee maker, a casing having a heating chamber, a heating element therein, ventilating shutters for the heating chamber, a coffeepot, a hand lever for closing the shutters and also closing the circuit through the heating element, and automatic means controlled by the contents of the coffeepot for opening the circuit through the heating element and also for opening the shutters, said automatic means including a pair of spaced terminals in the coffeepot, a switch carried by the hand lever, a trip lever and an electromagnet for operating it.

14. In an electric coffee maker, a casing having a heating chamber, a heating element therein, ventilating shutters for the heating chamber, a coffeepot including a lower vessel formed integral with the heater casing, a hand lever for closing the shutters and also closing the circuit through the heating element, and automatic means controlled by the contents of the coffeepot for opening the circuit through the heating element and also for opening the shutters, said automatic means including a pair of spaced terminals in the coffeepot, a switch carried by the hand lever, a trip lever and an electromagnet for operating it.

15. In an electric coffee maker, a casing having a heating chamber, a heating element therein, ventilating shutters for the heating chamber, a coffeepot, a hand lever for closing the shutters and also closing the circuit through the heating element, and automatic means controlled by the contents of the coffeepot for opening the circuit through the heating element and also for opening the shutters, said automatic means including a switch on the hand lever, a trip lever and a fluid pressure controlled pump for operating it.

16. In an electric coffee maker, a casing having a heating chamber, a heating element therein, ventilating shutters for the heating chamber, a coffeepot including a lower vessel formed integral with the heater casing, a hand lever for closing the shutters and also closing the circuit through the heating element, and automatic means controlled by the contents of the coffeepot for opening the circuit through the heating element and also for opening the shutters, said automatic means including a switch on the hand lever, a trip lever and a fluid pressure controlled pump for operating it.

17. In an electric coffee maker, a casing having a heating chamber, a heating element therein, a ventilator for the heating chamber, a coffeepot including a lower vessel having a handle and a valved pouring spout, manually operated means for closing the circuit through the heating element and also closing the ventilator, and automatic means controlled by the contents of the coffeepot for opening the circuit through the heating element and also for opening the ventilator.

18. In an electric coffee maker, a casing having a heating chamber, a heating element therein, a ventilator for the heating chamber, a coffeepot including a lower vessel having a handle and a valved pouring spout, said lower vessel being formed integral with the heater casing, manually operated means for closing the circuit through the heating element and also closing the ventilator, and automatic means controlled by the contents of the coffeepot for opening the circuit through the heating element and also for opening the ventilator.

CLYDE D. KEATON.